US008675025B2

(12) United States Patent
Arrasvuori

(10) Patent No.: US 8,675,025 B2
(45) Date of Patent: Mar. 18, 2014

(54) METHOD AND APPARATUS FOR PROVIDING CONTROL OVER A DEVICE DISPLAY BASED ON DEVICE ORIENTATION

(75) Inventor: Juha Henrik Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 1110 days.

(21) Appl. No.: 12/640,573

(22) Filed: Dec. 17, 2009

(65) Prior Publication Data

US 2011/0148935 A1 Jun. 23, 2011

(51) Int. Cl.
*G09G 5/00* (2006.01)
(52) U.S. Cl.
USPC ........................................ 345/672; 345/629
(58) Field of Classification Search
USPC .................................. 345/629, 672
See application file for complete search history.

(56) References Cited

U.S. PATENT DOCUMENTS

| 5,499,327 | A | 3/1996 | Satoh |
| 6,175,343 | B1 | 1/2001 | Mitchell et al. |
| 6,426,757 | B1 | 7/2002 | Smith et al. |
| 2002/0021278 | A1 | 2/2002 | Hinckley et al. |
| 2006/0071946 | A1 | 4/2006 | Anabuki et al. |
| 2009/0251460 | A1 | 10/2009 | Dunnigan |

FOREIGN PATENT DOCUMENTS

| EP | 1 866 043 A1 | 12/2007 |
| WO | WO 02/080106 A2 | 10/2002 |

OTHER PUBLICATIONS

Rohs, Michael, "Real-World Interaction with Camera-Phones", Ubiquitous Computing Systems, 2005-Springer, p. 1.*
Eissele, Mike "Orientation as an additional User Interface in Mixed-Reality Environments", Workshop GI-Fachgruppe AR/VR, 2004, p. 7.*
Ringwald, M., *UbiControl: Providing New and Easy Ways to Interact With Various Consumer Devices,* available at http://people.inf.ethz.ch/mringwal/publ/ringwald-ubicontrol.pdf, printed Feb. 16, 2010, 2 pages.
Kaowthumrong, K. et al., *Automated Selection of the Active Device in Interactive Multi-Device Smart Spaces,* available at http://www.cs/colorado.edu/~rhan/ActiveDevice.pdf, printed Feb. 16, 2010, 6 pages.
Neumann, R., *Manipulation of 3D objects in the Augmented Reality using Mobile Devices,* Diploma Thesis, Published Sep. 2008, IBM Deutschland GmbH, Chapter 1 Introduction, and pp. 8-77.
Hollerer, T. et al., *User Interface Management Techniques for Collaborative Mobile Augmented Reality,* Computers & Graphics, 25, (2001), pp. 799-810.
International Search Report and Written Opinion for International Application No. PCT/IB2010/055140 dated Mar. 17, 2011.

* cited by examiner

*Primary Examiner* — Maurice L McDowell, Jr.
(74) *Attorney, Agent, or Firm* — Alston & Bird LLP

(57) ABSTRACT

An apparatus for enabling provision of control over a device display based on device orientation may include at least one processor and at least one memory including computer program code. The at least one memory and the computer program code may be configured, with the processor, to cause the apparatus to perform at least receiving an indication of data associated with a first potential display view, receiving orientation information indicative of an orientation angle of a device including a display, and enabling provision of a display view at the display that includes a variable portion the first potential display view based on the orientation angle. A corresponding method and computer program product are also provided.

16 Claims, 8 Drawing Sheets

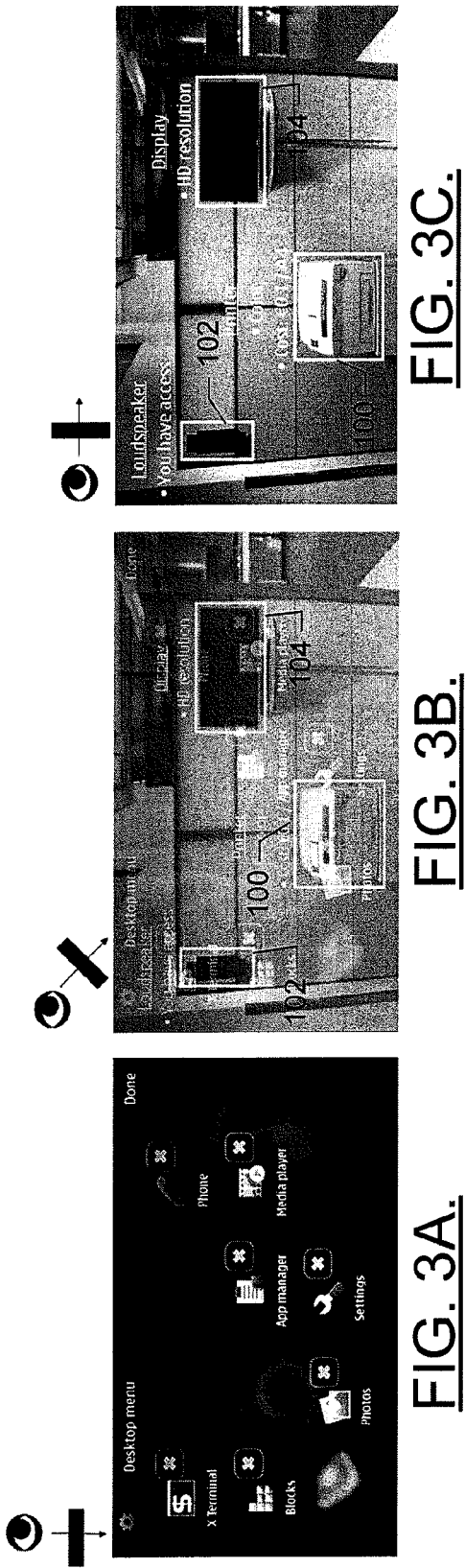

METHOD AND APPARATUS FOR PROVIDING CONTROL OVER A DEVICE DISPLAY BASED ON DEVICE ORIENTATION

TECHNOLOGICAL FIELD

Embodiments of the present invention relate generally to user interface technology and, more particularly, relate to a method and apparatus for enabling provision of control over a device display based on device orientation.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In some situations, mobile terminals may be enabled to interface with other devices in a specific area in order to utilize services associated with the other devices. For example, the mobile terminal may be enabled to interface with a nearby printer to request printing of a document using resources of the nearby printer. Alternatively or additionally, the mobile terminal may be enabled to interface with a nearby stereo system to play audio using the amplifier and speakers of the stereo system. As such, mobile terminals may be enabled to share resources with other devices in their local environment.

Some interesting use cases have developed around the capabilities of various devices to share resources. For example, augmented reality has been incorporated into such scenarios. Augmented reality is a term used to describe the merging of real world imagery associated with a real world environment with computer generated imagery. A very common example of augmented reality is experienced frequently when watching a sporting event on television with streaming or otherwise intermittently presented score or other status information being overlaid onto the video of the sporting action itself.

When incorporating augmented reality into the remote resource utilization scenario described above, a user may be enabled to capture an image of a space with various devices being visible in the image. The image may be a live image or a captured real world image. The devices in the image may be recognized as being associated with corresponding services that may be provided by the respective devices. A display of the image including the devices with information descriptive of the services associated with each respective device and a control function for accessing such services may then be provided. The description of the services or the control function may be computer generated imagery that "augments" the image of the actual space, thereby providing an augmented reality view. The augmented reality view may then be displayed on the mobile terminal to enable the user to access the respective devices via the control function that augments the real world view.

Although such an augmented reality view may be interesting and useful for users, such a view may only be useful with respect to granting access to limited functionalities associated with visible devices. Thus, users may be required to shift to another user interface related view in order to access other desirable functionalities. The time and effort associated with shifting views may reduce user enjoyment in some cases. For example, accessing other applications or interface options may require exiting or suppressing the augmented reality view. Accordingly, it may be desirable to provide an alternative mechanism by which to control a device display.

BRIEF SUMMARY

A method, apparatus and computer program product are therefore provided for enabling the provision of control over the display characteristics of a device based on device orientation. Accordingly, for example, a display of a device may be enabled to present one of two different views, having respective different functionalities associated therewith, overlaid with respect to each other such that a degree of overlay is based on the orientation of the device.

In one exemplary embodiment, a method of providing control over a device display based on device orientation is provided. The method may include receiving an indication of data associated with a first potential display view, receiving orientation information indicative of an orientation angle of a device including a display, and enabling provision of a display view at the display that includes a variable portion the first potential display view based on the orientation angle.

In another exemplary embodiment, a computer program product for providing control over a device display based on device orientation is provided. The computer program product includes at least one computer-readable storage medium having computer-executable program code instructions stored therein. The computer-executable program code instructions may include program code instructions for receiving an indication of data associated with a first potential display view, receiving orientation information indicative of an orientation angle of a device including a display, and enabling provision of a display view at the display that includes a variable portion the first potential display view based on the orientation angle.

In another exemplary embodiment, an apparatus for providing control over a device display based on device orientation is provided. The apparatus may include at least one processor and at least one memory including computer program code. The at least one memory and the computer program code may be configured, with the processor, to cause the apparatus to perform at least receiving an indication of data associated with a first potential display view, receiving orientation information indicative of an orientation angle of a device including a display, and enabling provision of a display view at the display that includes a variable portion the first potential display view based on the orientation angle.

Embodiments of the invention may provide a method, apparatus and computer program product for employment in devices so that, for example, device users may enjoy improved capabilities with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 4B:
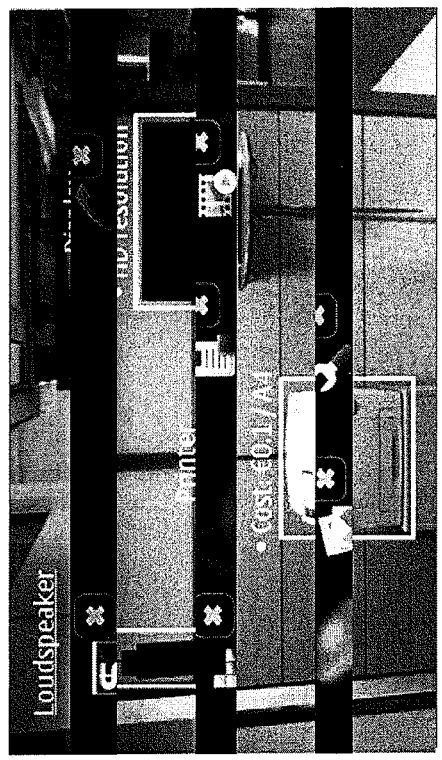
Figure 4A:
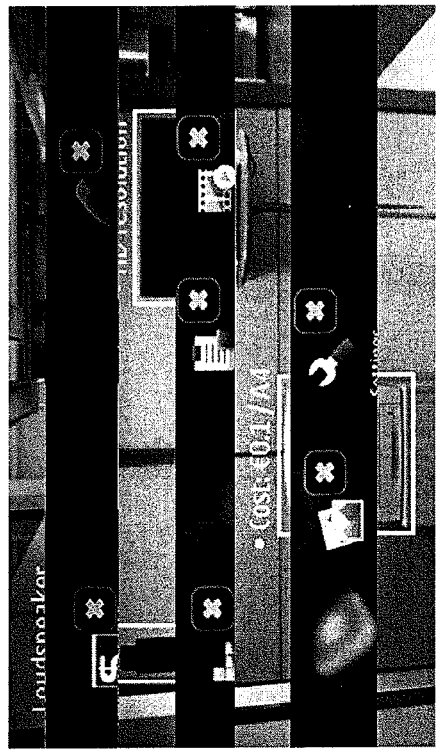
Figure 5B:
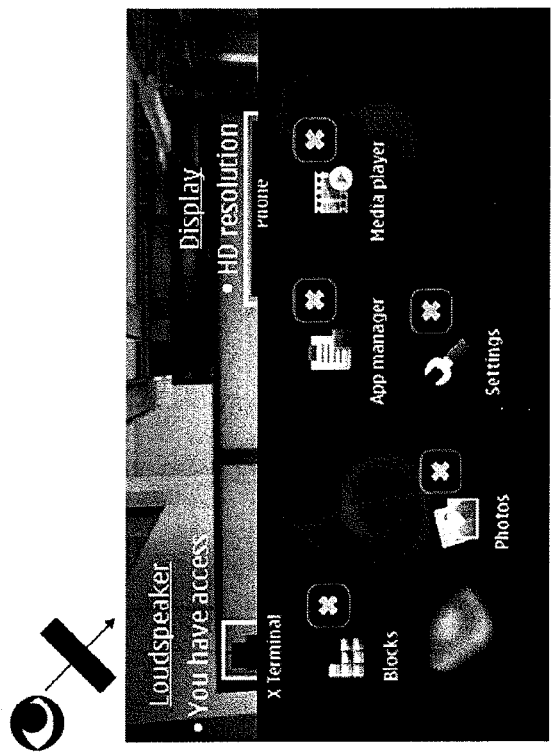
Figure 5A:
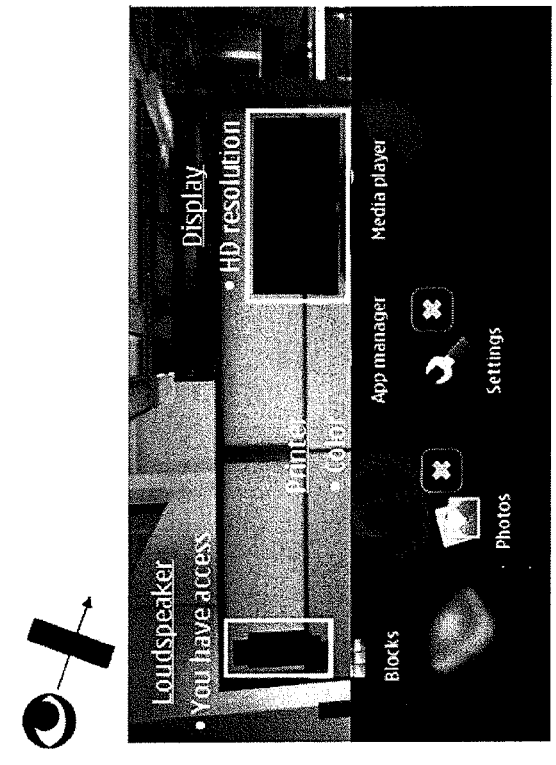
Figure 6C:
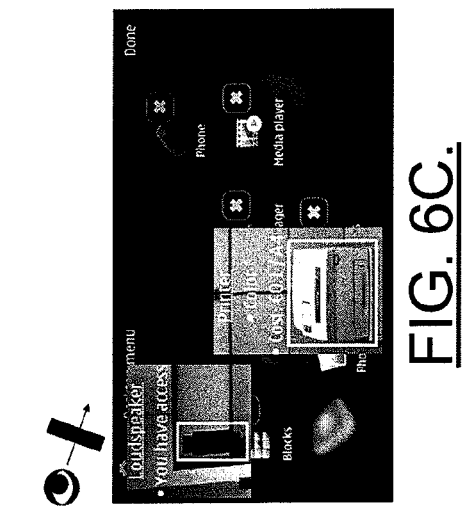
Figure 6B:
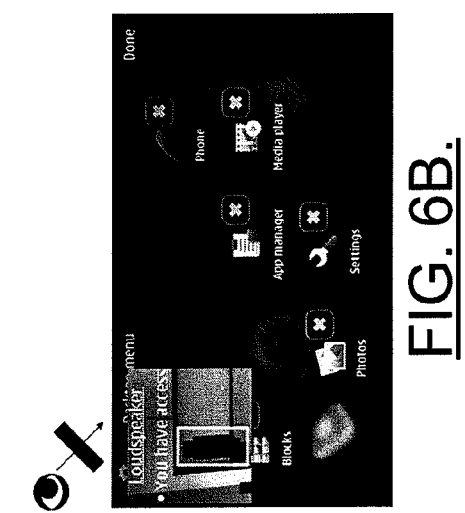
Figure 6A:
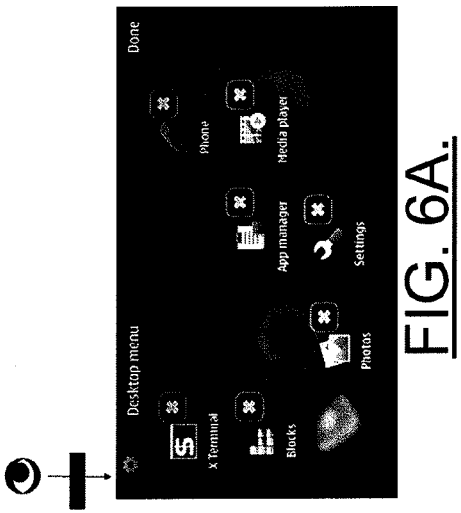
Figure 7:
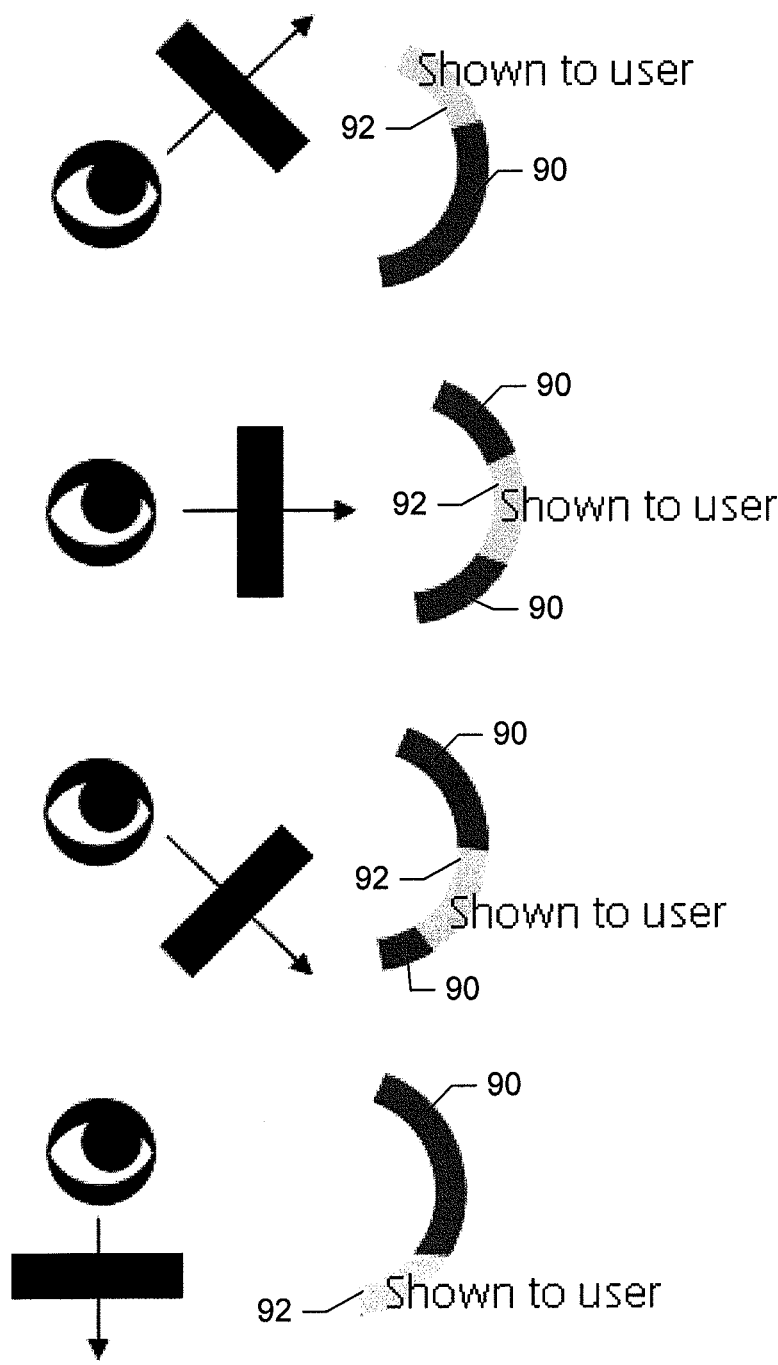
Figure 8:
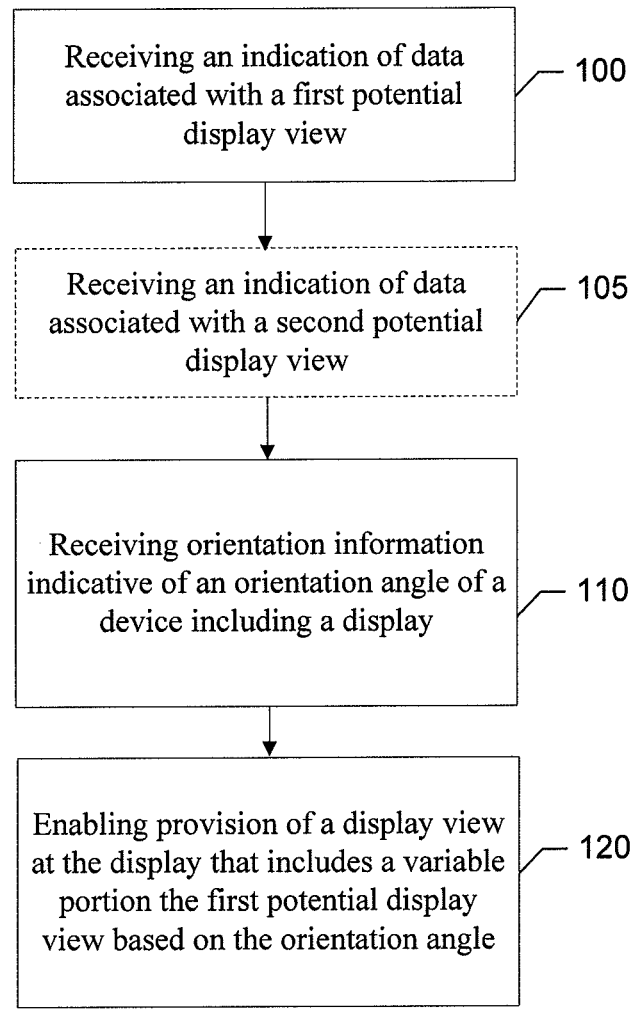

FIG. 3, which includes FIGS. 3A, 3B and 3C, shows an example transition over variable degrees of overlay between two selected orientation angle extremes according to an example embodiment of the present invention;

FIG. 4, which includes FIGS. 4A and 4B, illustrates an alternative embodiment with a "venetian blind" type of overlay or transition according to an example embodiment of the present invention;

FIG. 5, which includes FIGS. 5A and 5B, illustrates an alternative embodiment with a "roller blind" type of overlay or transition according to an example embodiment of the present invention;

FIG. 6, which includes FIGS. 6A, 6B and 6C, shows another example embodiment of the present invention in which the varying degree at which overlays are presented based on device orientation is provided in yet another alternative fashion;

FIG. 7 shows a series of device angles and the corresponding portion of the view that may be displayed to the user based on the orientation of the mobile terminal according to an example embodiment of the present invention; and FIG. 8 is a block diagram according to an exemplary method for enabling the provision of control over a device display based on device orientation according to an exemplary embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

Some embodiments of the present invention may be employed to, for example, provide an ability for a mobile terminal display to present at least two different views with varying degrees of overlay with respect to each other. Moreover, the degree of overlay, which may vary in a balanced manner from 0 to 100% visibility for each different view, may be controllable based on the orientation of the mobile terminal. Accordingly, for example, mobile terminal users may be enabled to utilize device functionality via one view (e.g., providing a user interface view of the mobile terminal's operating system user interface) and to utilize functionality of other devices in the vicinity via another view (e.g., providing an augmented reality view of nearby devices or services).

Figure 1:
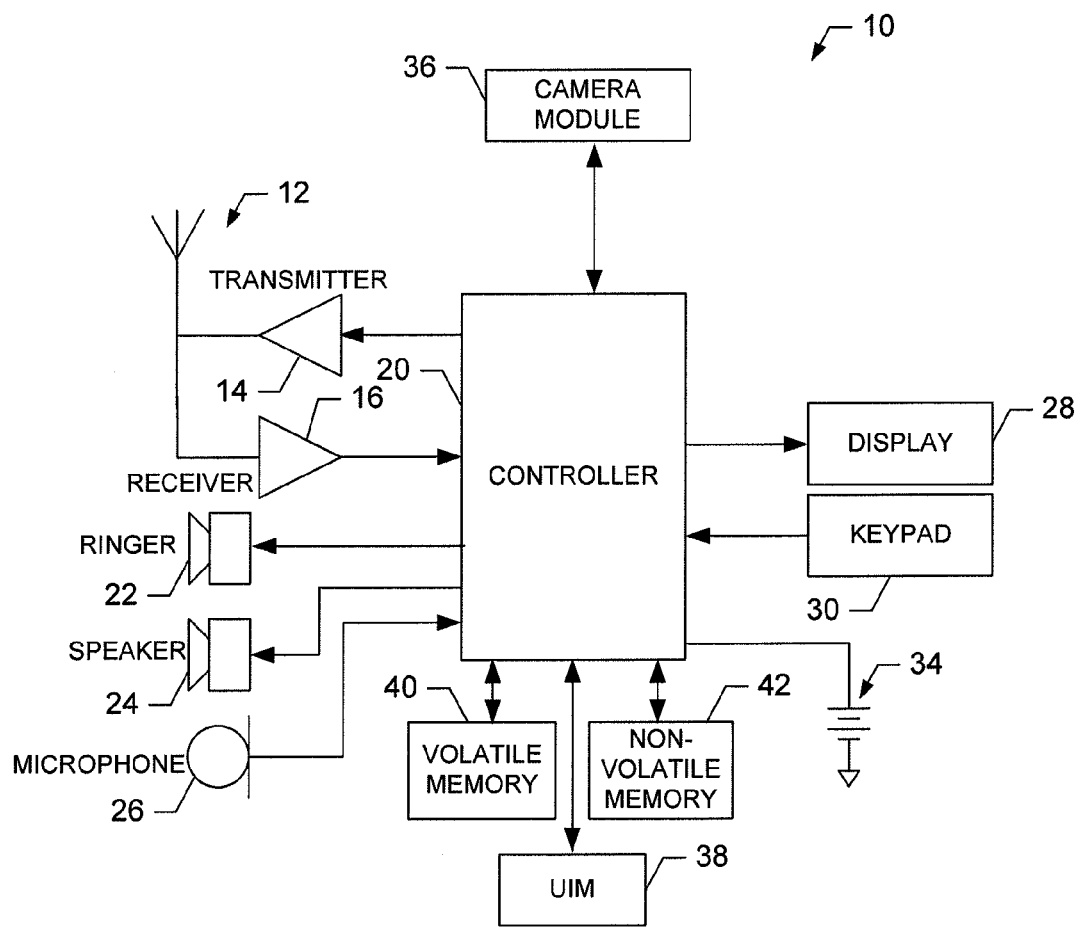
FIG. 1 is a schematic block diagram of a mobile terminal according to an exemplary embodiment of the present invention.

FIG. 1, one exemplary embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G)

wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

In some embodiments, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format or another like format. In some cases, the camera module 36 may provide live image data to the display 28. Moreover, in an exemplary embodiment, the display 28 may be located on one side of the mobile terminal 10 and the camera module 36 may include a lens positioned on the opposite side of the mobile terminal 10 with respect to the display 28 to enable the camera module 36 to capture images on one side of the mobile terminal 10 and present a view of such images to the user positioned on the other side of the mobile terminal 10.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10.

In an exemplary embodiment, the mobile terminal 10 of FIG. 1 may be associated with a particular user in an environment including other devices having resources capable of providing services accessible via the mobile terminal 10. In such cases, the mobile terminal 10 may be enabled to wirelessly communicate (directly or indirectly) with the other devices in order to utilize and in some cases control the provision of services offered by the other devices.

An exemplary embodiment of the invention will now be described with reference to FIG. 2, in which certain elements of an apparatus for enabling the provision of control over a device display based on device orientation are displayed. The apparatus of FIG. 2 may be employed, for example, on the mobile terminal 10 of FIG. 1. However, it should be noted that the apparatus of FIG. 2, may also be employed on a variety of other devices, and therefore, the present invention should not be limited to application on devices such as the mobile terminal 10 of FIG. 1. Alternatively, embodiments may be employed on a combination of devices including, for example, those listed above. Accordingly, embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Figure 2:
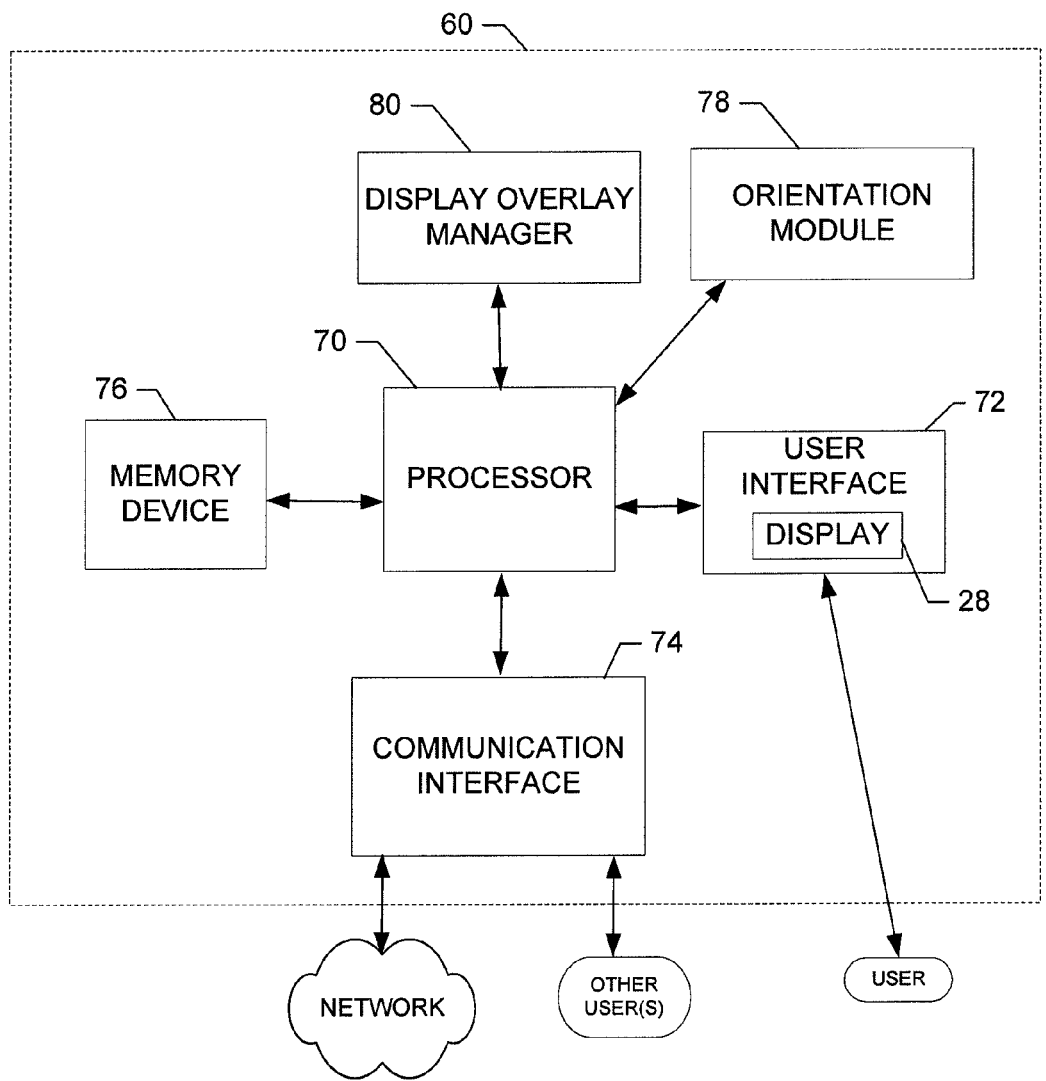
FIG. 2 is a schematic block diagram of an apparatus for providing control over a device display based on device orientation according to an example embodiment of the present invention.

Referring now to FIG. 2, an apparatus 60 for enabling the provision of control over a device display based on device orientation is provided. The apparatus 60 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 (which may be an example of the controller 20 of FIG. 1) may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 60 may further include an orientation module 78. Orientation module 78 may be configured to determine the orientation of mobile terminal 10 relative to a reference. In some cases, the reference may be perpendicular to the surface of the earth, or a line that is tangential with respect to the surface of the earth. However, other references could also be employed. In an example embodiment, the orientation of the field of view of the camera module 36 may be compared to the reference in order to determine the orientation of the mobile terminal 10. Thus, for example, the orientation module 78 may be configured to determine pitch and/or yaw of the mobile terminal 10. In this regard, in a situation in which the camera module 36 is held to aim straight down toward the ground, the camera module 36 may be said to be positioned at an angle of zero degrees (e.g., having a pitch of 0 degrees), while if the camera module is aimed straight up at the sky, the camera module 36 may be said to be positioned at an angle of one-hundred and eighty degrees (e.g., having a pitch of 180 degrees). Thus, if the camera module 36 is positioned such that the centerline of the field of view of the camera lies in a plane substantially parallel to the surface of the earth, the camera module 36 may be said to be positioned at an angle of ninety degrees (e.g., having a pitch of 90 degrees).

If the reference is not measured with respect to pitch, but is instead measured in terms of yaw, a measure of the rotation of the camera module 36 on its side may be provided. Thus, if the camera is held at a constant pitch of 90 degrees, with the field of view oriented so that the edges defining the top and bottom of the display are parallel with the surface of the earth, the device may be said to have 0 degrees of yaw. However, if the device is rotated such that the top and bottom of the display are perpendicular with the surface of the earth, the device may be said to have 90 degrees of yaw. In an example embodiment, the orientation module 78 may be configured to determine angles of pitch and/or yaw or any other orientation of interest. As such, for example, the orientation module 39 can include a device or other means for determining the pitch and/or yaw of the mobile terminal 10, which can collectively be referred to as orientation information. In some embodiments, the orientation module 78 may include an electronic compass, a horizon sensor, gravity sensor, accelerometer, gyroscope, magnetometer and/or the like or any other sensor that may be useful in determining orientation information. Thus, the orientation module 78 may be any means, device or circuitry for determining the orientation of mobile terminal 10.

In an exemplary embodiment, the processor 70 may be embodied as, include or otherwise control a display overlay manager 80. The display overlay manager 80 may be in communication with the user interface 72 (in some cases more specifically with the display 28 of the mobile terminal 10 or a display driver) to control display properties as described herein. The display overlay manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the display overlay manager 80 as described herein. Thus, in examples in which software is employed, a device or circuitry (e.g., the processor 70 in one example) executing the software forms the structure associated with such means.

In an exemplary embodiment, the display overlay manager 80 is configured to vary a degree of overlay with respect to two views that may be presented on the display 28 based on orientation information. As such, the display overlay manager 80 may be configured to generate a composite view that is comprised of fractional components of two different potential display views. In this regard, for example, the processor 70 may be capable of providing two different potential display views to the display overlay manager 80. The display overlay manager 80 may then provide control over the data displayed at the display 28 to overlay the two different potential display views in a desired fashion based on orientation information. In some cases, in addition to providing a variable degree of overlay, the actual overlay pattern may be varied by the display overlay manager 80 as well. Thus, for example, not only may the display overlay manager 80 be configured to alter the percentage of a display area that is devoted to any one of at least two possible display views, but the display overlay manager 80 may also provide control over a transition pattern by which a shift between overlay views is provided.

Accordingly, the provision of the overlaid data may be accomplished in a number of different ways or via different patterns. In some cases, one or more of the different display views may be assigned a level of opacity or transparency such that the display overlay manager 80 is enabled to provide an effect of fading one display view in while the other display view fades out over the range of orientation information changes that are expected to be received. Thus, for example, at one orientation, one display view may be overlaid over the other in a fully transparent fashion such that the overlay view is invisible and the display view being overlaid over is fully visible. As the orientation is altered, the transparency of the overlay view may slowly decrease until at another orientation, the overlay view is no longer transparent and completely obscures view of the display view being overlaid over. Accordingly, one display view or the other may appear to dissolve while the other becomes more distinct based on orientation information. In one example, an orientation angle of 0 degrees (or 180 degrees) may result in one view being fully dissolved while the other view is fully distinct. As orientation angle is shifted to 45 degrees, the dissolve ratio between the two views may be substantially even (e.g., about 50/50). Then as the orientation angle reaches 90 degrees, the view originally fully distinct may become fully dissolved and the view originally fully dissolved may become fully distinct.

As another alternative, each view may be apportioned a continuous portion of the display that is determined based on the orientation information. Thus, for example, when the orientation angle is 45 degrees, each of the two views may fully cover one respective half of the display screen (e.g., top half/bottom half, right half/left half, or an equal division along a diagonal). Meanwhile, as the orientation changes toward the orientation angle of 0 degrees, one of the two views may gradually dominate the display until such view covers 100 percent of the display at 0 degrees. As the orientation changes toward the orientation angle of 90 degrees, the other of the views may gradually dominate the display until such view covers 100 percent of the display at 90 degrees.

As still another alternative, the overlaid views need not necessarily be apportioned continuous portions of the display. Thus, for example, the display overlay manager 80 may apportion non-continuous portions of the display to each respective view in some cases. The non-continuous portions may be evenly distributed (e.g., to provide an appearance similar to the opening and closing of venetian blinds) or the non-continuous portions may not be evenly distributed (e.g., to provide a patchwork or random pattern).

As indicated above, in some examples there may be one orientation angle (perhaps, but not necessarily 45 degrees) at which a roughly 50/50 split of display portions are covered by each respective overlay view. However, in each case, the rate of change of display apportionment (e.g., the rate of dissolve, rate of display domination, etc.) and any limits to the maximum or minimum degrees of overlay (e.g., in terms of transparency, or display apportionment) may be a matter of design choice or user selection. Thus, for example, in some cases, the user may be enabled to provide settings to identify desired operational characteristics of embodiments of the present invention. As such, for example, the user may define maximum and minimum apportionment values for each respective view at orientation extremities or other specified orientation angles. Additionally or alternatively, the user may provide settings to indicate a midway point at which the apportionment allotted to each view is approximately even (if any such point exists). In some cases, the user may also define a constant or variable rate of change over a range of orientation angles (e.g., slow change in some regions and/or fast change in others).

In an example embodiment, one of the views may be an augmented reality view, while the other view may be a view of the operating system user interface of the mobile terminal 10 (which may in some cases be the home screen of the mobile terminal 10). Thus, for example, one view may provide a user interface for accessing functions and services associated with nearby devices via an augmented reality display view while the other view may provide a user interface for accessing functions and services associated with the local resources of the mobile terminal 10 (e.g., accessing physical storage of the mobile terminal 10, accessing applications or services hosted at the mobile terminal 10). As such, for example, the operating system user interface of the mobile terminal 10 may provide a home screen or series of menus providing icons or selectable items that launch corresponding applications or execute corresponding functions locally. Meanwhile, the augmented reality display view may provide a live or stored image of devices that the mobile terminal 10 may interface with in order to utilize resources of the corresponding devices.

FIG. 3, which includes FIGS. 3A, 3B and 3C, shows an example transition over variable degrees of overlay between two selected orientation angle extremes. In this regard, FIG. 3 shows a transition from full display apportionment to a first overlay comprising a view of the operating system user interface of the mobile terminal 10 (FIG. 3A) to full display apportionment to a second overlay comprising an augmented reality view (FIG. 3C) through a situation in which the first overlay and the second overlay are approximately equally visible on the display (FIG. 3B).

In this example, FIG. 3A may correspond to a 0 degree orientation angle (e.g., pointing the camera approximately straight down) and a home screen of the mobile terminal 10 may be fully displayed showing various selectable icons with corresponding functions or applications associated therewith. The user may select any of the icons to implement the corresponding functions by moving a cursor over the respective icons. In some cases, the cursor may highlight an icon when positioned to enable selection of the corresponding icon and may execute functionality associated with selection of the icon if user selection of the corresponding icon is detected.

FIG. 3C may correspond to a 90 degree orientation angle (e.g., pointing the camera approximately straight ahead) and an augmented reality view of the objects and devices in the field of view of the camera module 36 may be presented. The view may be augmented by indicating the identity and properties of a recognized device within the field of view. The view may also provide a selection zone 100, 102 or 104 (or hotspot) for selecting a function associated with each respective recognized device. For example, by selecting the selection zone 100 associated with the printer in FIG. 3C, the user may access printing functions of the printer. Meanwhile, by selecting the selection zone 102 associated with the loudspeaker, the user may be enabled to control an audio output function of the loudspeaker and by selecting selection zone 104 associated with a display device, the user may be enabled to control the output of the display device. In this regard, a menu may be presented responsive to selection of the selection zone 100, 102, or 104 to provide the available options for control of or access to the respective devices. In some cases, the augmented reality view may also include an indication regarding access rights or capabilities for recognized devices displayed. In an example case, printer functions could be accessed by dragging a file from the home screen to selection zone 100 (thereby transferring the file from the mobile terminal 10 to the printer). In such an example, if there is a fee associated with accessing a device (e.g., the printer), the fee may be added to the subscription account of the mobile terminal 10. The user may also or alternatively control a display device (e.g., associated with selection zone 104) and the printer by selecting both selection zones 100 and 104 and selecting a corresponding function or functions at the mobile terminal (e.g., sending information to the display or to the printer).

FIG. 3B may correspond to a 45 degree orientation angle and the overlaying of the views in this example may be provided via dissolving each respective view according to the orientation angle. Thus, at one extreme (e.g., the view of FIG. 3A, the augmented reality view is fully dissolved and the view of the home screen of the mobile terminal 10 is fully distinct, while at the other extreme (e.g., the view of FIG. 3C) the augmented reality view is fully distinct and the view of the home screen of the mobile terminal 10 is fully dissolved. However, roughly in the middle (e.g., at the 45 degree orientation angle shown in FIG. 3B), the two views are substantially equally dissolved such that details of both views are approximately equally distinct. Thus, functionality associated with either view may be accessed using selections made with a cursor.

FIG. 4, which includes FIGS. 4A and 4B, illustrates an alternative embodiment with a "venetian blind" type of overlay or transition. As can be seen in FIG. 4A, when the orientation angle is at a predetermined position (e.g., 45 degrees in this example), distributed portions of the display are apportioned to each view in substantially equal amounts. Thus, alternating rows (though columns could also be used) of display data are devoted to each respective view in substantially equal distributions (e.g., about 50% of the display being devoted to each respective view). However, other distributions may be provided or selected by the user at any given orientation angle.

When the orientation angle is changed in either direction, one of the views may become more dominant. Thus, as shown in the example of FIG. 4B, when the orientation angle is increased to about 65 degrees, a larger percentage of the view is devoted to the augmented reality view (e.g., approximately 75% of the display area). In this example, the rows apportioned to the augmented reality view have each become larger so that the rows of data apportioned to the view of the home screen have become smaller. The result gives the appearance of closing blinds that block a larger portion of the view of the home screen. Thus, in this instance it appears as though the view of the home screen is being increasingly obstructed by the overlaying of the augmented reality view.

FIG. 5, which includes FIGS. 5A and 5B, illustrates an alternative embodiment with a "roller blind" type of overlay or transition. In this example, it may again be assumed that an orientation angle of 0 degrees provides a full view of the home screen and an orientation angle of 90 degrees provides a full view of the augmented reality view. Thus, for example, when the orientation angle is increased from 0 degrees, the overlay of the augmented reality view may begin to "roll" into view by gradually extending from an edge of the display as the orientation angle increases. In the example of FIG. 5A, the orientation angle has increased to a value of about 30 degrees and the augmented reality view has rolled down from the top of the display view to overlay about one-third of the full display view, while the remaining two-thirds of the full display view is still displaying a view of the home screen. When the orientation angle reaches about 45 degrees, the display view will show about one half of the augmented reality view (e.g., the top half in FIG. 5B) and about one half of the view of the home screen (e.g., the bottom half in FIG. 5B). Although the overlay action of "rolling" one display view out over the other view from an edge of the display is shown in a top to bottom direction in FIG. 5, the direction could alternatively be side to side or even from one corner to another where the overlay advances along a diagonal. Furthermore, although in some instances the overlay of one view may be directly laid over the other view, in some alternative cases the items within one or both of the overlay views could be altered in size in order to fit the corresponding amount of the view allotted to each respective view. In other words, for example, as the augmented reality view begins to be overlaid over the view of the home screen, the size and/or position of the icons on the home screen may decrease or otherwise shift to allow the icons to remain visible for a longer period of time until the icons become obscured.

FIG. 6, which includes FIGS. 6A, 6B and 6C, shows another example embodiment of the present invention in which the varying degree at which overlays are presented based on device orientation is provided in yet another alternative fashion. As indicated above, the apportionment of the display area to each respective view need not necessarily be accomplished in a continuous and/or evenly distributed fashion. FIG. 6 shows an example in which a discontinuous and uneven distribution for performance of the overlay transition is accomplished.

In this regard, FIG. 6 shows an example starting point where a full view of the home screen is shown at an orientation angle of 0 degrees. In an example embodiment, as the orientation angle increases, an increasing percentage of the display view is gradually converted or transitioned to the augmented reality view until the augmented reality view overlays the full display view at an orientation angle of about 90 degrees. However, as the orientation angle increases and portions of the display view are converted to augmented realty view portions, those converted portions are not necessarily continuous or evenly distributed. In the example of FIG. 6, portions of the display view are converted based on proximity of the converted portion to regions of interest. As such, areas near regions of interest may be converted prior to areas that are remote from any region of interest. Where multiple regions of interest are potential targets for conversion, the rate of usage (e.g., based on historical information) or popularity of a particular target may determine the order in which regions are converted. As an example, referring to FIG. 3, the regions proximate to the recognized devices (e.g., selection zones 100, 102 or 104) may be considered to be regions of interest. Other portions of the augmented reality view may not display usable devices and are thus of less interest. Working in the reverse direction, regions near icons on the home screen may be regions of interest that are prioritized ahead of other portions when converting the display view. The regions of interest and corresponding hierarchy for conversion of respective regions may be defined in a rule set that governs conversion from one view to the other view. As such, other rules may be defined to direct the varying degrees of overlay and the manner in which the overlay or conversion is performed including rules for operation in accordance with the other example embodiments described above or rules for still further embodiments not specifically described herein.

In an example embodiment, a view may sometimes be presented as a portion of a larger view, where the presented portion of the view (e.g., the overlay of visible display area) is determined based on the orientation angle. As an example, a canvas corresponding to the user interface of a home screen or an active portion (e.g., corresponding to an area with useable devices that cannot be captured one field of view) of an augmented reality view may be larger than the display view of the display 28. Thus, a scrolling (e.g., vertically and/or horizontally) view or "vertically positioned panorama" (e.g., a hemisphere or half-sphere that shows 180 degrees of visual information) may be provided based on the orientation of the mobile terminal 10. As such, the user may be enabled to view a "slice" of the hemisphere based on the user's current view, with other information being available for viewing outside of the focus area defined by the orientation of the mobile terminal 10. FIG. 7 shows a series of device angles and the corresponding portion of the view that may be displayed to the user based on the orientation of the mobile terminal 10.

In the example of FIG. 7, the portions of the total potential field of view that are not shown in the display view are labeled with reference number 90 and portions of the potential field of view that are shown are labeled 92. It should be noted that although FIG. 7 shows vertical scrolling over a canvas based on orientation angle, horizontal scrolling (or a combination of vertical and horizontal scrolling) may also be provided based on orientation angle (or a combination of pitch and yaw based orientation angles).

Accordingly, in some embodiments of the present invention, a device display may be enabled to provide a composite display view based on orientation of the device. Moreover, the composite display view may include a selected contribution from 0 to 100 percent of one potential view and a corresponding selected contribution from another potential view of 100 to 0 percent. The respective selected contributions may be managed based on device orientation to provide users with relatively easy access to different functionalities associated with each respective potential view.

FIG. 8 is a flowchart of a system, method and program product according to exemplary embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of steps for performing the specified functions and program instruction means for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

In this regard, one embodiment of a method for enabling provision of control over a device display based on device orientation may include receiving an indication of data associated with a first potential display view at operation 100. The method may further include receiving orientation information indicative of an orientation angle of a device including a display at operation 110 and enabling provision of a display view at the display that includes a variable portion the first potential display view based on the orientation angle at operation 120. The provision of the variable portion of the first potential display view may include providing a partial view of the entire first potential display view in connection with a scrolling function that enables viewing of other portions based on orientation angle. However, in other embodiments, the variable portion of the first potential display view that is presented may correlate to a fractional portion of the first potential display view that is displayed in a composite view with a corresponding fractional portion of a second potential display view such that the composite view covers the full display and may include variable portions of each of the first and second potential display views based on device orientation.

In some embodiments, certain ones of the operations above may be modified or further amplified as described below. Furthermore, in some embodiments, additional optional operations may be included, an example of which is shown in dashed lines in FIG. 8. Modifications or amplifications to the operations above may be performed in any order and in any combination. In this regard, for example, the method may further include receiving an indication of data associated with a second potential display view at operation 105. In such an example embodiment, enabling provision of the display view may include providing the first potential display view overlaid with respect to the second potential display view with a degree of overlay that is based on the orientation angle. In some embodiments, enabling provision of the display view further comprises providing the first potential display view overlaid with respect to the second potential display view with a degree of transparency of at least one of the first potential display view or the second potential display view being based on the orientation angle. Alternatively or additionally, enabling provision of the display view may include providing the first potential display view overlaid with respect to the second potential display view such that a continuous (or discontinuous) portion of the first potential display view replaces a corresponding continuous (or discontinuous) portion of the second potential display view based on the orientation angle. In some cases, discontinuous portions of the first potential display view that replace corresponding discontinuous portions of the second potential display view based on the orientation angle may be either evenly or unevenly distributed.

In an exemplary embodiment, an apparatus for performing the method of FIG. 4 above may comprise one or more processors (e.g., the processor 70) configured to perform some or each of the operations (100-120) described above. The processor may, for example, be configured to perform the operations (100-120) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-120 may comprise, for example, corresponding ones of the processor 70, the display overlay manager 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least perform:
   receiving an indication of data associated with a first potential display view;
   receiving an indication of data associated with a second potential display view;
   receiving orientation information indicative of an orientation angle of a device including a display; and
   enabling provision of a display view at the display that includes a variable portion of the first potential display view based on the orientation angle by providing the first potential display view overlaid with respect to the second potential display view with a degree of overlay that is based on the orientation angle,
   wherein the memory and computer program code are configured to, with the processor, cause the apparatus to enable provision of the display view by providing the first potential display view overlaid with respect to the second potential display view such that a discontinuous portion of the first potential display view replaces a corresponding discontinuous portion of the second potential display view based on the orientation angle.

2. The apparatus of claim 1, wherein the memory and computer program code are configured to, with the processor, cause the apparatus to provide the first potential display view overlaid with respect to the second potential display view by providing for evenly distributed discontinuous portions of the first potential display view to replace corresponding evenly distributed discontinuous portions of the second potential display view based on the orientation angle.

3. The apparatus of claim 1, wherein the memory and computer program code are configured to, with the processor, cause the apparatus to provide the first potential display view overlaid with respect to the second potential display view by providing for unevenly distributed discontinuous portions of the first potential display view to replace corresponding unevenly distributed discontinuous portions of the second potential display view based on the orientation angle.

4. The apparatus of claim 1, wherein the first potential display view corresponds to an augmented reality view and the second potential display view corresponds to a view of a mobile device operating system user interface.

5. An apparatus comprising at least one processor and at least one memory including computer program code, wherein the memory and computer program code are configured to, with the processor, cause the apparatus to at least perform:
   receiving an indication of data associated with a first potential display view;
   receiving an indication of data associated with a second potential display view;
   receiving orientation information indicative of an orientation angle of a device including a display; and enabling provision of a display view at the display that includes a variable portion of the first potential display view based on the orientation angle by providing the first potential display view overlaid with respect to the second potential display view with a degree of overlay that is based on the orientation angle, wherein the memory and computer program code are configured to, with the processor, cause the apparatus to enable provision of the display view by providing the first potential display view overlaid with respect to the second potential display view such that a continuous portion of the first potential display view replaces a continuous portion of the second potential display view based on the orientation angle.

6. The apparatus of claim 5, wherein the first potential display view corresponds to an augmented reality view and the second potential display view corresponds to a view of a mobile device operating system user interface.

7. A method comprising:
receiving an indication of data associated with a first potential display view;
receiving an indication of data associated with a second potential display view;
receiving orientation information indicative of an orientation angle of a device including a display; and
enabling, via a processor, provision of a display view at the display that includes a variable portion of the first potential display view based on the orientation angle by providing the first potential display view overlaid with respect to the second potential display view with a degree of overlay that is based on the orientation angle,
wherein enabling provision of the display view further comprises providing the first potential display view overlaid with respect to the second potential display view such that a discontinuous portion of the first potential display view replaces a corresponding discontinuous portion of the second potential display view based on the orientation angle.

8. The method of claim 7, wherein providing the first potential display view overlaid with respect to the second potential display view comprises providing for evenly distributed discontinuous portions of the first potential display view to replace corresponding evenly distributed discontinuous portions of the second potential display view based on the orientation angle.

9. The method of claim 7, wherein providing the first potential display view overlaid with respect to the second potential display view comprises providing for unevenly distributed discontinuous portions of the first potential display view to replace corresponding unevenly distributed discontinuous portions of the second potential display view based on the orientation angle.

10. The method of claim 7, wherein the first potential display view corresponds to an augmented reality view and the second potential display view corresponds to a view of a mobile device operating system user interface.

11. A method comprising:
receiving an indication of data associated with a first potential display view;
receiving an indication of data associated with a second potential display view;
receiving orientation information indicative of an orientation angle of a device including a display; and
enabling, via a processor, provision of a display view at the display that includes a variable portion of the first potential display view based on the orientation angle by providing the first potential display view overlaid with respect to the second potential display view with a degree of overlay that is based on the orientation angle,
wherein enabling provision of the display view further comprises providing the first potential display view overlaid with respect to the second potential display view such that a continuous portion of the first potential display view replaces a continuous portion of the second potential display view based on the orientation angle.

12. The method of claim 11, wherein the first potential display view corresponds to an augmented reality view and the second potential display view corresponds to a view of a mobile device operating system user interface.

13. A computer program product comprising at least one non-transitory computer-readable storage medium having computer-executable program code instructions stored therein, the computer-executable program code instructions, upon execution by a processor, causing performance of:
receiving an indication of data associated with a first potential display view;
receiving an indication of data associated with a second potential display view;
receiving orientation information indicative of an orientation angle of a device including a display; and
enabling provision of a display view at the display that includes a variable portion of the first potential display view based on the orientation angle by providing the first potential display view overlaid with respect to the second potential display view with a degree of overlay that is based on the orientation angle,
wherein enabling provision of the display view includes providing the first potential display view overlaid with respect to the second potential display view such that a continuous or discontinuous portion of the first potential display view replaces a corresponding continuous or discontinuous portion of the second potential display view based on the orientation angle.

14. The computer program product of claim 13, wherein the first potential display view corresponds to an augmented reality view and the second potential display view corresponds to a view of a mobile device operating system user interface.

15. A computer program product comprising at least one non-transitory computer-readable storage medium having computer-executable program code instructions stored therein, the computer-executable program code instructions, upon execution by a processor, causing performance of:
receiving an indication of data associated with a first potential display view;
receiving an indication of data associated with a second potential display view;
receiving orientation information indicative of an orientation angle of a device including a display; and
enabling provision of a display view at the display that includes a variable portion of the first potential display view based on the orientation angle by providing the first potential display view overlaid with respect to the second potential display view with a degree of overlay that is based on the orientation angle,
wherein enabling provision of the display view includes providing the first potential display view overlaid with respect to the second potential display view such that evenly or unevenly distributed discontinuous portions of the first potential display view replace corresponding evenly or unevenly distributed discontinuous portions of the second potential display view based on the orientation angle.

16. The computer program product of claim 15, wherein the first potential display view corresponds to an augmented reality view and the second potential display view corresponds to a view of a mobile device operating system user interface.

\* \* \* \* \*